United States Patent
Sterner et al.

(10) Patent No.: US 7,032,875 B2
(45) Date of Patent: Apr. 25, 2006

(54) BAG CLOSING APPARATUS

(75) Inventors: Keith W. Sterner, Bethlehem, PA (US); Dennis E. Graham, Bethlehem, PA (US); John F. Simonof, Jr., Easton, PA (US); David R. Gill, Stewartsville, NJ (US)

(73) Assignee: Flexicon Corporation, Bethlehem, PA (US)

( * ) Notice: Subject to any disclaimer, the term of this patent is extended or adjusted under 35 U.S.C. 154(b) by 0 days.

(21) Appl. No.: 11/129,429

(22) Filed: May 13, 2005

(65) Prior Publication Data
US 2005/0218358 A1  Oct. 6, 2005

Related U.S. Application Data

(63) Continuation of application No. 10/337,484, filed on Jan. 7, 2003, now Pat. No. 6,892,510, which is a continuation-in-part of application No. 09/558,706, filed on Apr. 26, 2000, now Pat. No. 6,502,367.

(51) Int. Cl.
    *F16K 7/04* (2006.01)
(52) U.S. Cl. .................. 251/5; 251/7; 251/9
(58) Field of Classification Search .......... 251/5, 251/7, 9; 53/138.3, 138.7
    See application file for complete search history.

(56) References Cited

U.S. PATENT DOCUMENTS

| | | | | |
|---|---|---|---|---|
| 1,809,091 A | * | 6/1931 | Wiken | 251/9 |
| 3,473,779 A | * | 10/1969 | Gustafson et al. | 251/9 |
| 3,841,535 A | * | 10/1974 | Taupin | 251/9 |
| 4,322,054 A | * | 3/1982 | Campbell | 251/5 |
| 4,569,502 A | * | 2/1986 | Elliott | 251/7 |
| 5,121,682 A | | 6/1992 | Parker et al. | |
| 5,155,976 A | | 10/1992 | Okabe et al. | |
| 5,230,497 A | * | 7/1993 | Atkins | 251/9 |
| 5,391,154 A | * | 2/1995 | Young | 251/9 |
| 5,495,707 A | | 3/1996 | Lauzon | |
| 5,787,689 A | | 8/1998 | Dearing | |
| 5,918,447 A | | 7/1999 | Hanten et al. | |
| 6,196,519 B1 | * | 3/2001 | Utterberg | 251/9 |
| 6,234,448 B1 | * | 5/2001 | Porat | 251/9 |
| 6,536,738 B1 | * | 3/2003 | Inoue et al. | 251/5 |
| 6,705,063 B1 | | 3/2004 | Topfer et al. | |

FOREIGN PATENT DOCUMENTS

DE  1882434  11/1963

OTHER PUBLICATIONS

GEL-Verfahrenstechnik mbH Brochure, Handling-Gerät zur Teilentleerung von Big-Bags.

* cited by examiner

*Primary Examiner*—John Bastianelli
(74) *Attorney, Agent, or Firm*—Volpe and Koenig, P.C.

(57) ABSTRACT

A bag closing apparatus including a frame structure, a cinching assembly and an actuator assembly. The cinching assembly includes at least three pivot arms, each pivot arm including an arcuate portion and pivotably connected to the frame structure. The pivot arms are located relative to each to define a confined closure area. The actuator assembly includes a plurality of actuators for moving the pivot arms between spread positions and closed positions wherein the closure area has a smaller area.

15 Claims, 9 Drawing Sheets

BAG CLOSING APPARATUS

CROSS REFERENCE TO RELATED APPLICATIONS

This application is a continuation of U.S. patent application Ser. No. 10/337,484, filed Jan. 7, 2003 now U.S. Pat. No. 6,892,510, which is a continuation-in-part of U.S. patent application Ser. No. 09/558,706, filed Apr. 26, 2000, now U.S. Pat. No. 6,502,367, which is incorporated by reference as if fully set forth.

BACKGROUND

The present invention relates to the unloading of bulk bags used as containers for dry or moist particulate materials. The present invention more particularly relates to the unloading of bulk bag containers fabricated from cloth like material, such as woven polyester material, which is usually sewn in a cubical configuration.

Bulk bags made of heavy cloth material have been known in the art for sometime. It has also been known to provide the bag with heavy corner straps which support the bag when it is hung in a tower like support frame. The opposite end of the bag typically has a central outlet spout which is aligned with a discharge unit, for example a conveyer, hopper or the like, into which the material in the bag is intended to be discharged. Prior to discharge, the spout is maintained in a closed position, typically by tying-off of the spout.

Figure 1:
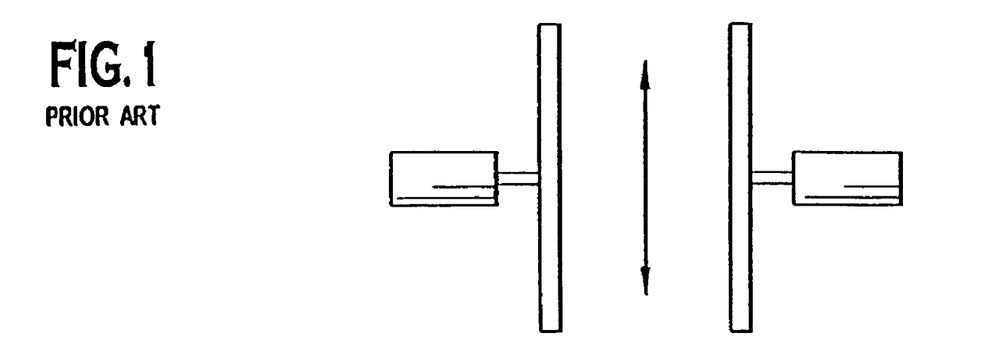
FIGS. 1–3 are top plan views of prior art bag closing devices.
Figure 2:
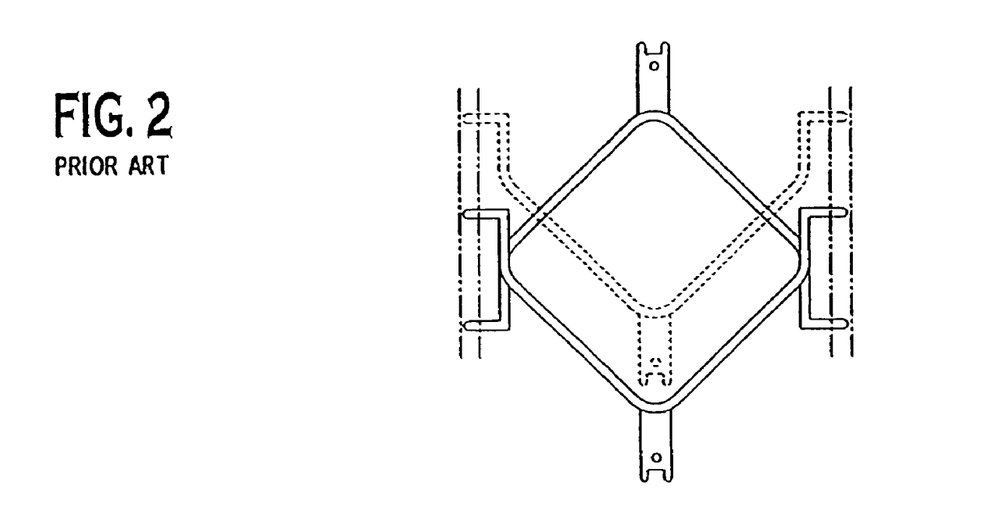
Figure 3:
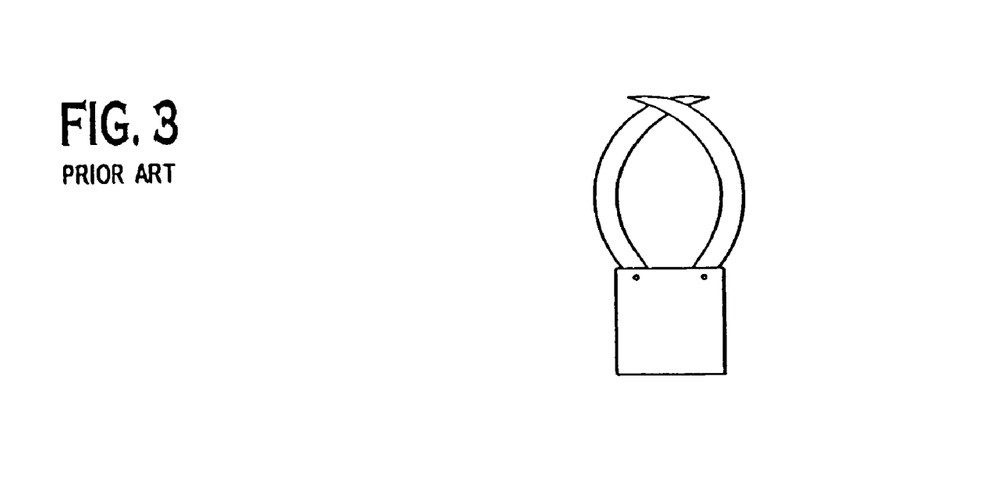
Figure 4:
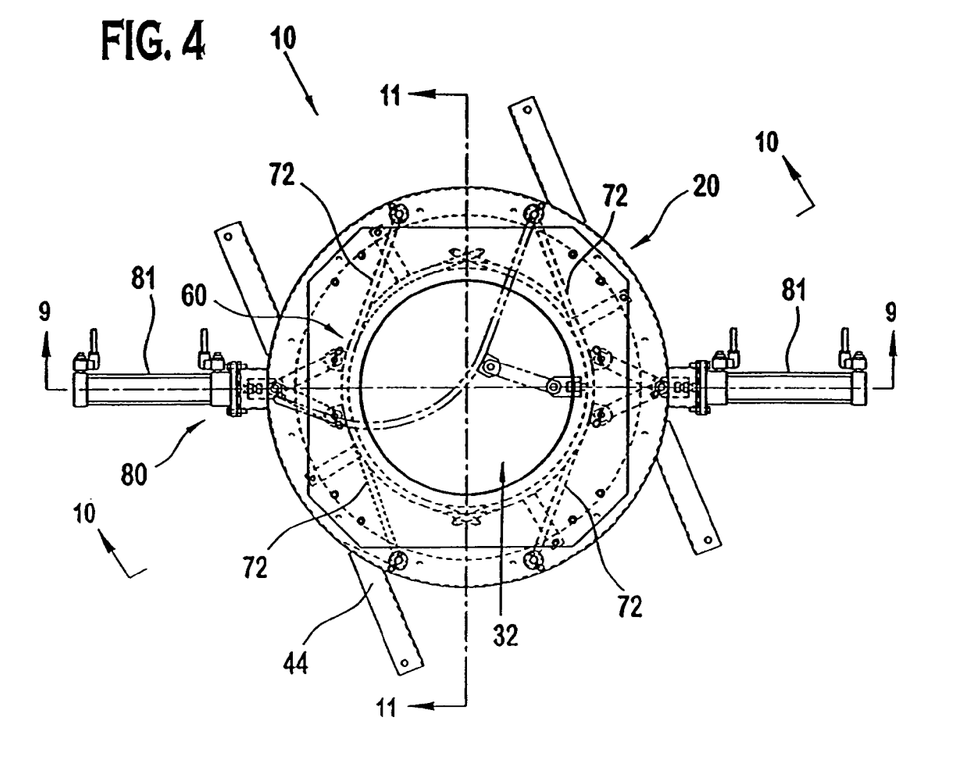
FIG. 4 is a top plan view of the preferred embodiment of the present invention.

To discharge the bag, the bag is hung in the support frame and the spout engaged with the discharge unit. The spout is opened and the particulate material flows via gravity through the spout. It is often desirable to control flow of material from the spout, for example, to permit batch weighing or to permit re-tying of the bag. Various types of bag closing devices, examples of which are illustrated in FIGS. 1–3, have been employed. In the device of FIG. 1, opposed bars, either flat or cylindrical, are moved together by fluid cylinders. As the spout is closed, it flattens in the direction of the arrows in FIG. 1. As a result, the flattened, wide spout is difficult to re-tie, particularly if the spout is short. The device of FIG. 2 attempts to overcome such by providing substantially v-shaped opposed bars, as described in U.S. Pat. No. 5,787,689. However, at the two points of overlap between the opposed bars, the bag is susceptible to pinching which may cut the bag or the bag may roll out between the overlapped bars. Referring to FIG. 3, a "claw" like device is shown. The bag is again susceptible to pinching in such a device. Additionally, in some applications, for example where the particulate material is dense, a significant amount of torque is required to closed the opposed claw members.

Accordingly, there is a need for an apparatus which assists in restricting a bag spout while reducing the likelihood of pinching of the spout.

It would also be desirable to provide a mechanical pinch valve for various other applications.

SUMMARY

The present invention provides a bag closing apparatus including a frame structure, a cinching assembly and an actuator assembly. The cinching assembly includes a plurality of pivot arms, each pivot arm including an arcuate portion and pivotably connected to the frame structure. The pivot arms are located relative to each other such that each pivot arm crosses at least one other pivot arms to define a confined closure area. The actuator assembly includes a plurality of actuators for moving the pivot arms between spread positions wherein the closure area has a predetermined area and closed positions wherein the closure area has a smaller area.

DETAILED DESCRIPTION OF THE PREFERRED EMBODIMENTS

The preferred embodiment of the present invention will be described with reference to the drawing figures where like numerals represent like elements throughout.

Figure 5:
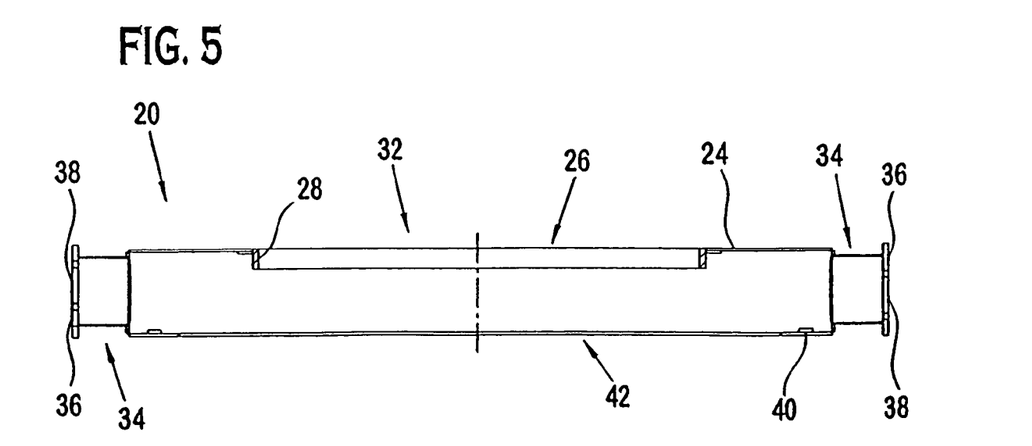
FIG. 5 is a cross-sectional view of the housing of the preferred embodiment of the present invention.
Figure 6:
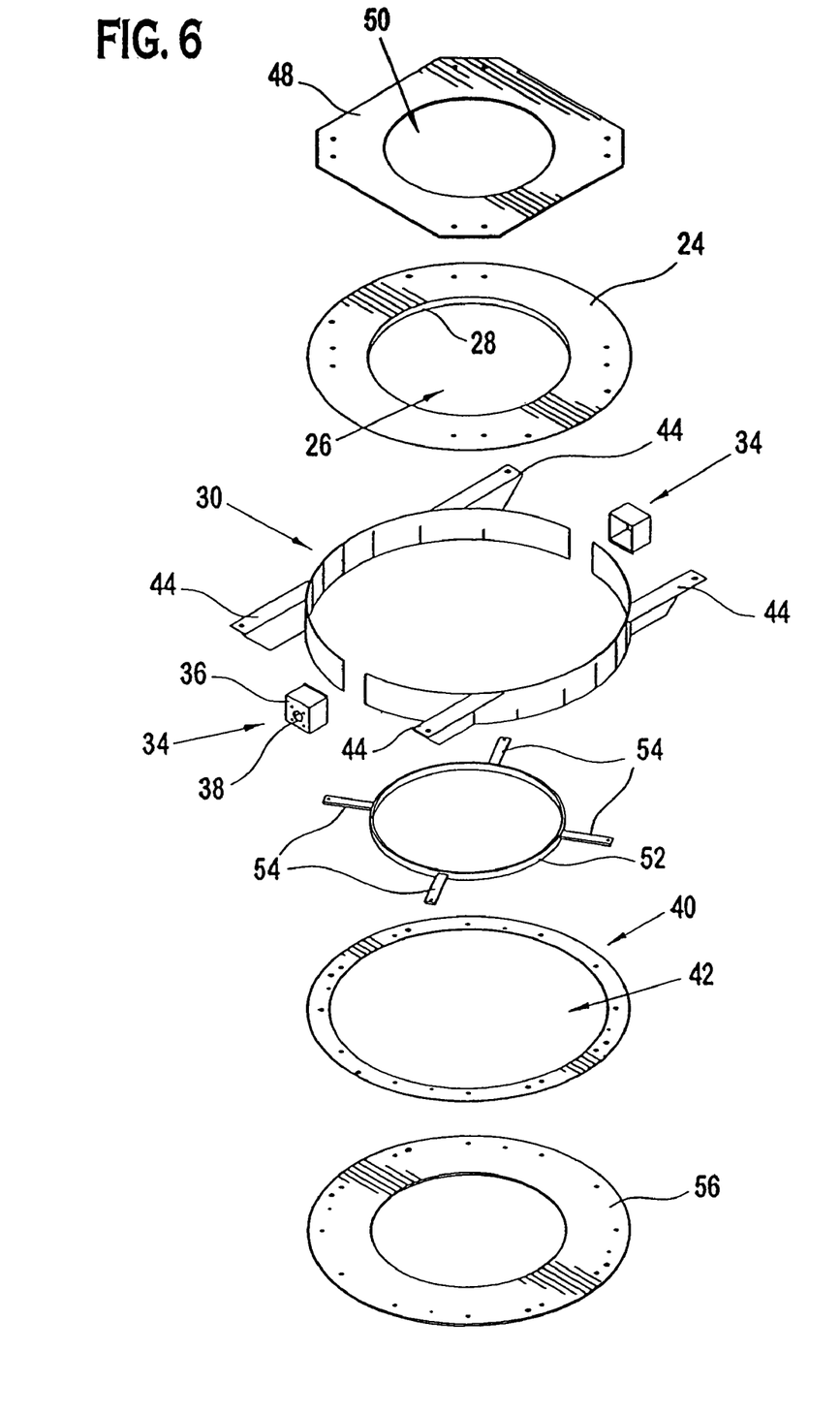
FIG. 6 is an exploded view of the housing of the preferred embodiment of the present invention.

Referring to FIGS. 4–11, the preferred embodiment 10 of the present invention is shown. The bag closing apparatus 10 comprises a housing 20 and a cinching assembly 60. Referring to FIGS. 5 and 6, the preferred housing 20 includes a split cylindrical body 30 secured between round top and bottom plates 24 and 40. The plates have coaxial apertures 26 and 42 such that a cylindrical path 32 extends through the housing 20. A plurality of mounting brackets 44 extend from the cylindrical body 30 for mounting the apparatus 10 on a frame (not shown) or other discharge unit (not shown). The body 30, plates 24, 40 and brackets 44 are preferably manufactured from sheet metal of approximately 10 or 12 gauge.

A pair of cylinder mounting boxes 34 are secured to the housing 20 in alignment with the open areas 31 of the split housing body 30. Each box 34 has a mounting plate 36 with an aperture 38 extending therethrough. As will be described in more detail hereinafter, a fluid cylinder 81 is mounted to each mounting plate 36 with its piston rod 82 aligned with the respective aperture 38. The boxes 34 are preferably manufactured from 14 gauge sheet metal and the plates 36 from one-quarter inch (3") steel bar. The top and bottom plates 24,40, the body 30, the brackets 44, the boxes 34, and the mounting plates 36 are preferably welded together, but may be secured by other means.

A support ring 52 is preferably secured to the bottom plate 40 by a plurality of flanges 54 extending therefrom. The support ring 52 is preferably manufactured from a half inch (2") steel rod and finished smooth on its upper surface. The support ring 52 provides support and a smooth guide surface for the pivot arms 72 as will be described in more detail hereinafter. A ring 28 depends from the top plate 24 about the aperture 26. The ring 28 also provides a smooth guide surface for the pivot arms 72 as will be described in more detail hereinafter.

A removable support plate 48 with an aperture 50 therethrough may be attached to the top plate 24 with the apertures 50 and 26 coaxially aligned. The support plate aperture 50 is preferably sized to the dimension of the bag spout, i.e., if the spout has a sixteen inch (16") diameter, the support plate aperture 50 will have a slightly oversized diameter. The support plate 48 thereby helps prevent sagging of the bag portion into the closing apparatus 10. If a different size spout is used, the support plate 48 can be interchanged. An apertured guard 56 may be secured to the bottom plate 40 to help prevent unwanted objects from entering the apparatus 10. The support plate 48 and the guard 56 are preferably manufactured from one-quarter inch (3") high density polyethylene.

Figure 7:
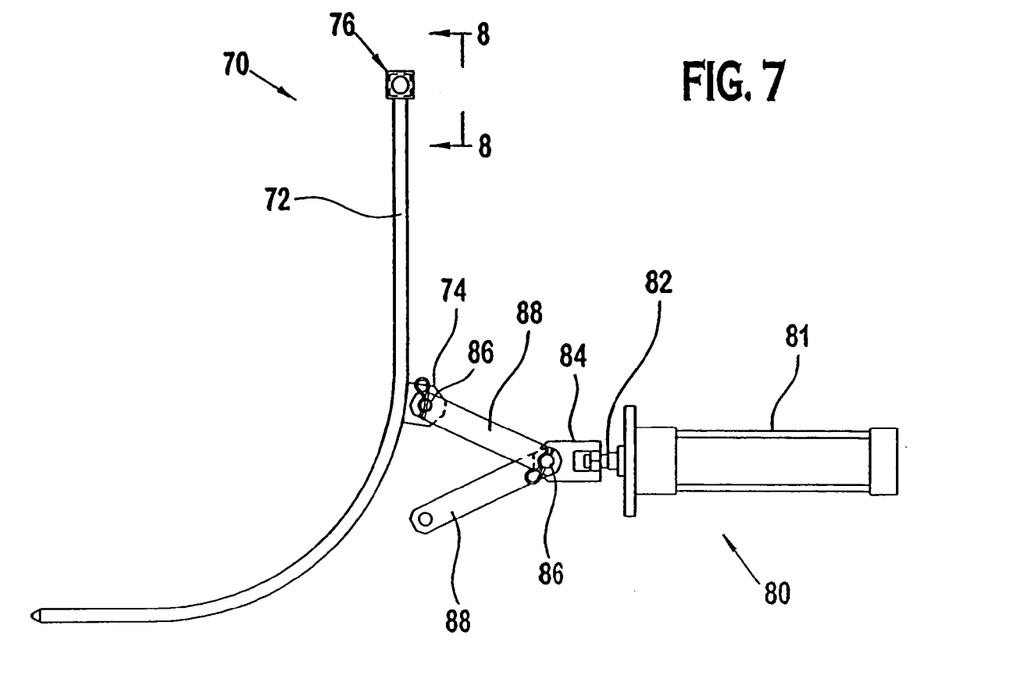
FIG. 7 is a top plan view of a pivot arm assembly of the preferred embodiment of the present invention.
Figure 8:
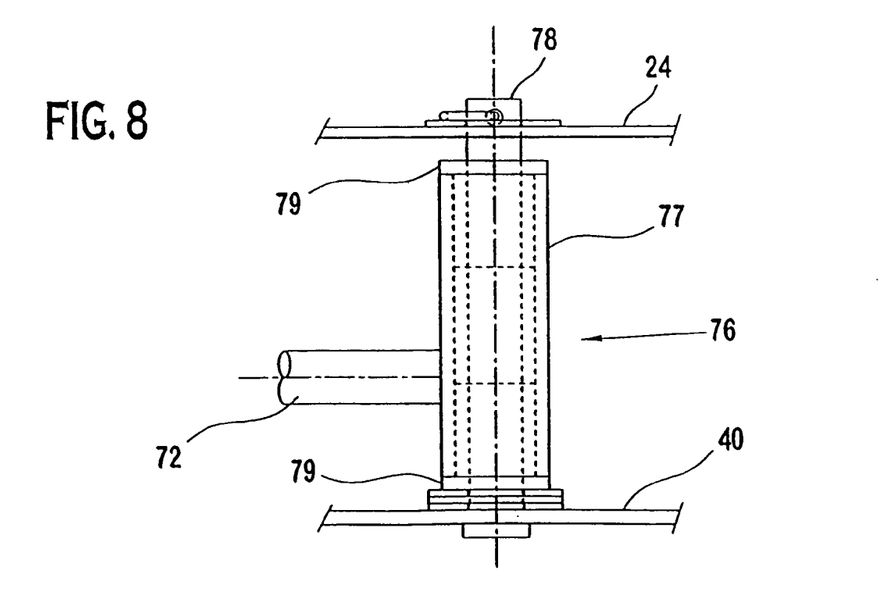
FIG. 8 is a side elevation view of a portion of the pivot arm assembly along the line 8—8 in FIG. 7.

The cinching assembly 60 will be described with reference to FIGS. 7–11. The preferred cinching assembly 60 comprises four pivot arm assemblies 70 and a pair of actuator assemblies 80, although fewer or more of each may be utilized. Referring to FIGS. 7 and 8, each pivot arm assembly 70 includes a substantially J-shaped pivot arm 72 extending from a pivot tube 76. The pivot arms 72 are preferably manufactured from half inch (2") steel rod and may be provided with a tapered tip. A link tab 74 extends from each pivot arm 72 for interconnection with a respective actuator assembly 80. Each pivot tube 76 includes a hollow body 77 upon which a respective pivot arm 72 is mounted. A shaft 78 extends through the hollow body 77 and is pivotably secured with respect to the top and bottom plates 24, 40. Bushings 79 or the like may be utilized about the shaft 78.

The preferred actuator assemblies 80 include fluid actuated cylinders 81 in communication with an air supply line or the like (not shown). A piston rod 82 extends from the cylinder 81 and is connected to an attachment plate 84. A pair of link bars 88, one above and one below, are pivotably connected to the attachment plate 84 via a pin 86 or the like. The opposite ends of the link bars 88 are then pivotably connected to a link tab 74 extending from a respective pivot arm 72. By securing one link bar 88 above and one below the attachment plate 84, the link bars 88 properly align with the link tabs 74 of the pivot arms 72 which are at different elevations. Alternatively, one actuator assembly 80 may be utilized for each pivot arm assembly 70.

Figure 9:
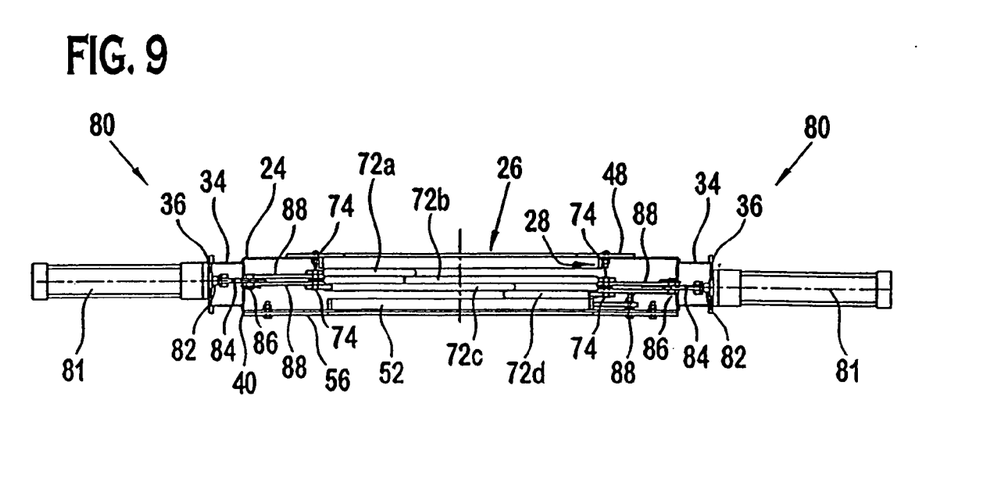
FIG. 9 is a cross-sectional view along the line 9—9 in FIG. 4.
Figure 10:
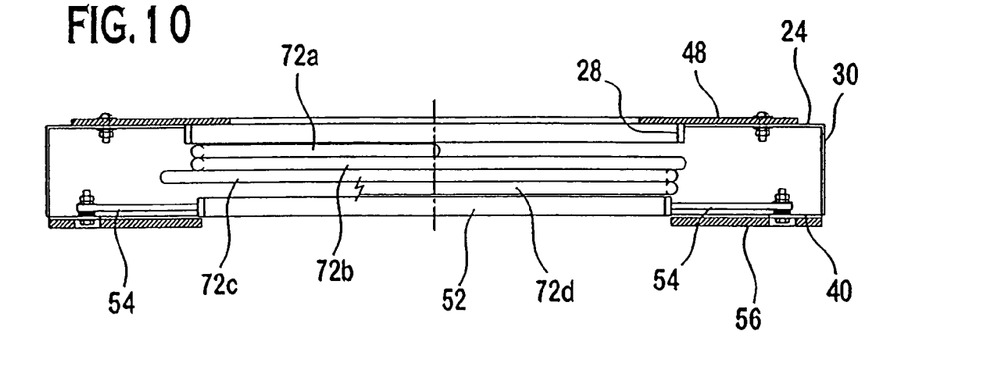
FIG. 10 is a cross-sectional view along the line 10—10 in FIG. 4.
Figure 11:
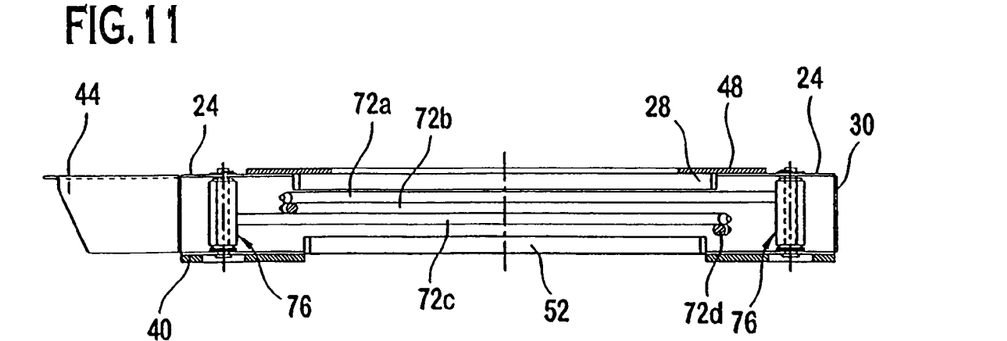
FIG. 11 is a cross-sectional view along the line 11—11 in FIG. 4.

Referring to FIGS. 9–11, the four pivot arms 72a–72d are stacked one upon the other and upon the support ring 52. The support ring 52 and top ring 28 are preferably spaced such that the pivot arms 72a–72d abut, as shown in FIG. 10, but remain slidable relative to one another. The abutting relationship helps prevent the spout from moving between adjacent pivot arms 72. Referring to FIG. 11, the pivot arms 72a–72d are mounted at different heights on their respective pivot tubes 76 to provide proper alignment. Additionally, to provide proper alignment of the fluid actuated cylinders 81, such are preferably mounted off-set from one another. As shown in FIG. 9, the higher mounted cylinder 81 actuates pivot arms 72a and 72c and the lower mounted air cylinder 81 actuates pivot arms 72b and 72d.

Figure 12:
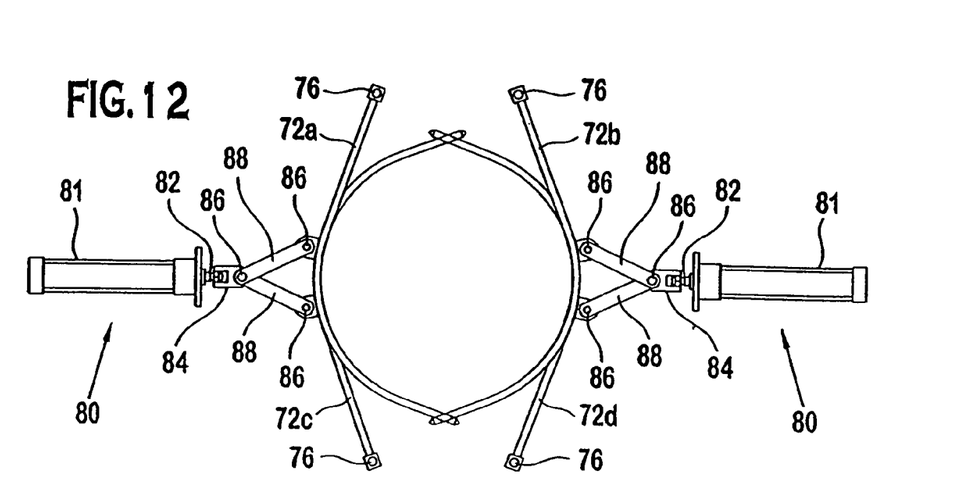
FIGS. 12–14 are top plan views illustrating the cinching sequence of the cinching assembly of the preferred embodiment of the present invention.
Figure 13:
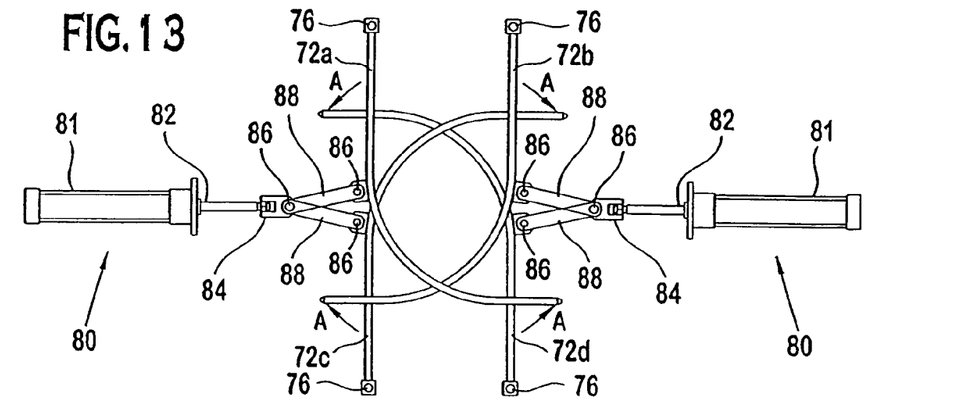
Figure 14:
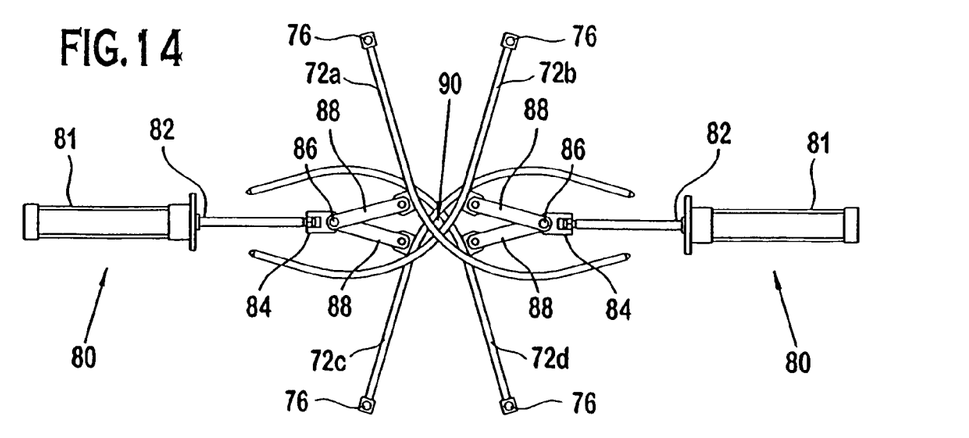
Figure 16:
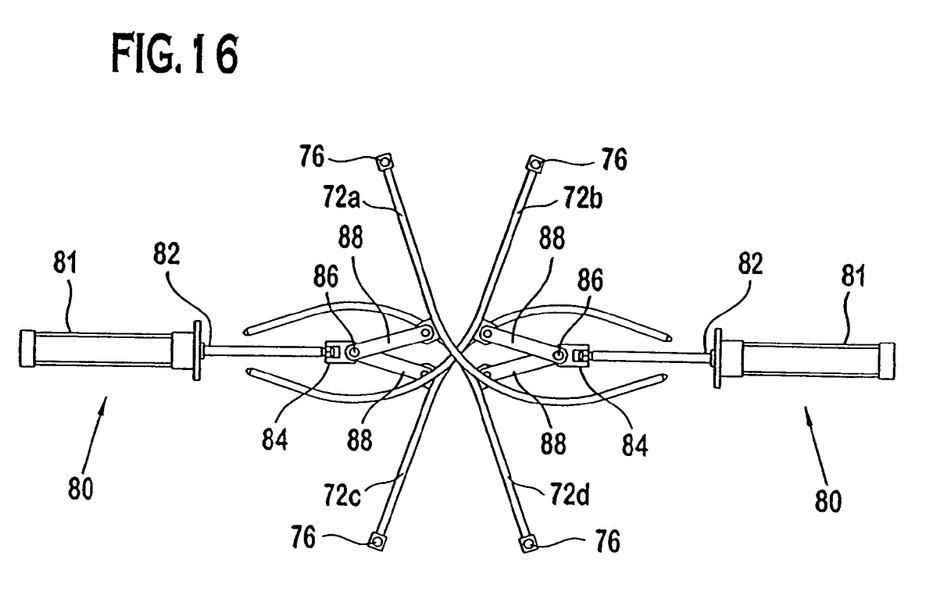
FIG. 16 is a top plan view illustrating the cinching assembly with the pivot arms extended to a position beyond the central region, shown in FIG. 14, to an overlapped position.

The cinching sequence will now be described with reference to FIGS. 12–14. Referring to FIG. 12, the actuator assemblies 80 are non-energized and the pivot arms 72 are in an open, generally circular configuration. In this configuration, a spout can be passed through the assembly 10 and engaged with a discharge unit. When it is desired to close the spout, the fluid cylinders 81 are actuated to extend the rods 82. The pivotably connected link bars 88 translate the linear force to move the pivotably connected pivot bars 72 along an arcuate path as represented by the arrows A in FIG. 13. The arcuate path and the curvature of the pivot arms 72 minimizes the potential for pinching of the spout. Actuation of the cylinders 81 continues as the pivot arms 72 constrict the bag to a central region 90. The pivot arms 72 are then extended to a position beyond the central region 90, as shown in FIG. 16, and overlap such that the bag spout forms a "Z" as it travels between the pivot arms 72. The over extension is preferred, but may not be required in all applications.

Figure 15:
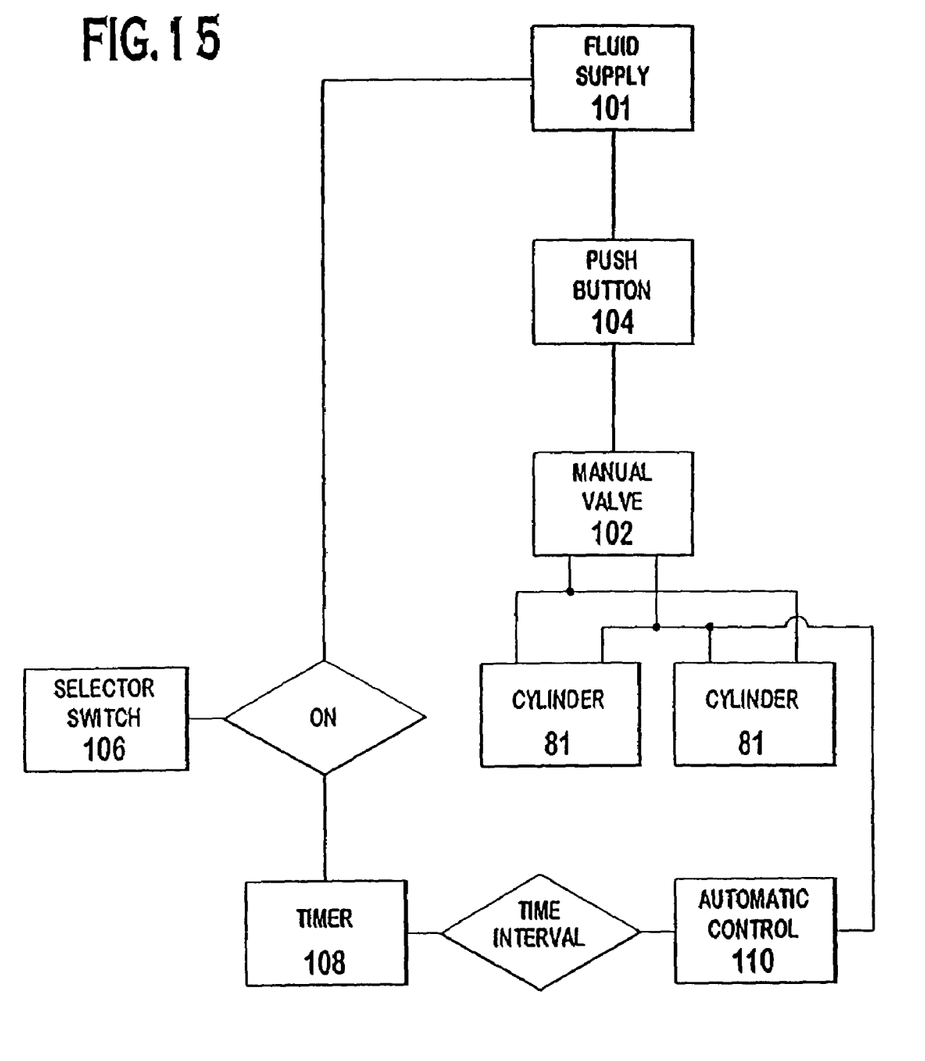
FIG. 15 is a flow diagram of the preferred operating system of the present invention.

The preferred operating system 100 of the closing assembly 10 will be described with reference to FIG. 15. The preferred operating system 100 includes a manual valve 102, a safety push button 104, a selector switch 106, a timer 108, and an automatic control 110. The manual valve 102 controls the flow of fluid into the cylinders 81 and is moveable between a neutral position and "close" and "open" positions wherein fluid is provided to the cylinders 81 to extend or retract the rods 82. To operate the assembly 10 manually, an operator uses the manual valve 102 to control flow into and out of the cylinder 81 as desired. The system 100 also preferably includes a safety push button 104 which closes the fluid supply 101 unless engaged. If either the push button 104 or valve 102 is released, pressure to the cylinder 81 will cease. As such, the operator must use one hand to engage the push button 104 and the other to operate the manual valve 102, thereby reducing the likelihood the operator will inadvertently place a hand in the path of the moving components.

In some instances, an operator may want to remove one or both hands while maintaining pressure in the cylinder 81, for example, to retie the spout. As such, the preferred system 100 also includes an automatic control 110. To utilize the automatic control 110, the selector switch 106 must be in the "auto" position. If the switch 106 is in the "auto" position, the timer 108 will time the duration the manual valve 102 is in the "close" position. If the manual valve 102 is in the "close" position for a given time interval, for example five seconds, the timer 108 will trigger the automatic control 110. The automatic control 110 will then continue to supply fluid pressure to the cylinder 81, irrespective of whether the manual valve 102 or push button 104 are engaged, until the operator moves the selector switch 106 to a "manual" position. With the selector switch in the "manual" position, the operator can use the manual valve 102 to open the cinching assembly 60. Other manual and automatic operating systems may also be used.

Figure 17:
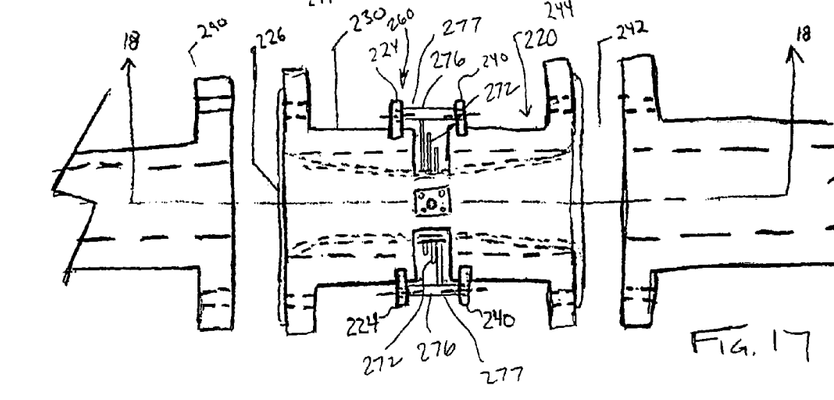
FIG. 17 is a side profile view of the housing of a pinch valve in accordance with a second embodiment of the present invention excluding the cinching assembly.
Figure 18:
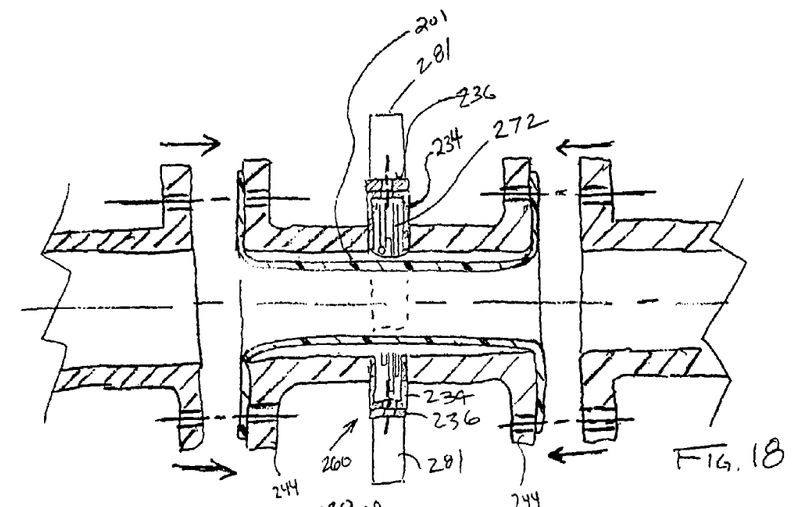
FIG. 18 is a cross-sectional view along the line 18—18 in FIG. 17.

Referring to FIGS. 17 and 18, a pinch valve 220 in accordance with a second embodiment of the present invention, for regulating material flow, is shown. The pinch valve 220 is adapted to be connected in a pipe 290, and includes a housing with a first end 226 for receiving a material flow and a second end 242 for discharging the material flow. A cylindrical housing 230 contains an elastic bladder 201 through which the material flows. A mounting box 234 which is similar to the mounting box 34 discussed above, is secured to the cylindrical body 230. Flanges 244 are attached to mating flanges on the conduit 290 to produce a closed material flow system. However, other types of connections could be used, including a threaded compression connection, a solder joint, and a weld joint.

The second embodiment of the pinch valve 220 employs a cinching assembly 60 and cinching sequence substantially identical to that of the described first embodiment. Actuators 281 attaches to mounting plate 236 as shown in FIG. 18, which is in turn secured to mounting box 234. A first plate 224 and a second plate 240 cooperate with shafts 277, as shown in FIG. 17, to form the cinching assembly 260 in the same manner as the cinching assembly 60 described above. When the actuators 281 are non-energized, the pivot arms 272 are in an open, generally circular configuration allowing full unhindered material flow through the bladder 201. Actuating the fluid cylinders 281 causes rotation of the pivot arms 272, in the same manner as the pivot arms 72 described above, thereby constricting the bladder and potentially reducing material flow. Material flow can be arrested completely when pivot arms 272 are extended to a closed position. Depending upon the material thickness of the bladder, the flow may be arrested without totally closing off the central region.

What is claimed is:

1. A pinch valve, for regulating a material flow, comprising:
    a housing;
    at least three pivot arms, each of the pivot arms having first and second ends and an arcuate portion therebetween, pivotably connected to the housing adjacent one of the ends thereof and located relative to each other such that each of the pivot arms crosses at least two other ones of the pivot arms to define a confined closure area;
    an actuator for moving the pivot arms along an arcuate path between a spread position wherein the closure area has a predetermined area and closed positions wherein the closure area has a smaller area; and
    a tubular bladder having a first end for receiving material and a second end for discharging material extending through the confined closure area, the bladder being displaceable by the pivot arms to a substantially closed position upon the actuator being activated.

2. The pinch valve of claim 1, wherein a fourth pivot arm and a second actuator are provided, the pivot arms being connected in pairs to the first and second actuators for activation.

3. The pinch valve of claim 1, wherein the bladder is secured in proximity to both ends of the pinch valve.

4. The pinch valve of claim 1, wherein the at least three pivot arms close off the closure area.

5. The pinch valve of claim 1, wherein the bladder returns to an open position through an elastic property of a material used to form the bladder when the pivot arms are in the spread position.

6. The pinch valve of claim 1, further comprising connectors for in series connection of the pinch valve in a conduit.

7. A pinch valve, for regulating a material flow, comprising:
    a housing;
    four pivot arms, each of the pivot arms having first and second ends and an arcuate portion therebetween, pivotably connected to the housing adjacent one of the ends thereof and located relative to each other such that each of the pivot arms crosses at least two other ones of the pivot arms to define a confined closure area;
    an actuator for moving the pivot arms along an arcuate path between spread positions wherein the closure area has a predetermined generally circular area through an intermediate position, in which the pivot arms define a generally elliptical area, to a closed position wherein the closure area has a smaller area; and
    a tubular bladder having a first end for receiving material and a second end for discharging material extending through the confined closure area, the bladder being displaceable by the pivot arms to a substantially closed position upon the actuator being activated.

8. The pinch valve of claim 7, wherein the pivot arms close off the closure area.

9. The pinch valve of claim 7, wherein the bladder returns to an open position through an elastic property of a material used to form the bladder.

10. The pinch valve of claim 7, further comprising connectors for in series connection of the pinch valve in a conduit.

11. A pinch valve, for regulating a material flow, comprising:
    a housing having first and second ends with a generally tubular bladder extending therethrough and forming a material flow path between the first and second ends; and
    a cinching assembly connected to the housing, the cinching assembly including pivot arms that are engageable with the bladder, the pivot arms overlap one another to define a confined closure area through which the bladder extends and being moveable between a spread position, in which the closure area has a predetermined generally circular area, to a closed position, in which the closure area has a smaller area.

12. The pinch valve of claim 11, wherein there are four of the pivot arms, and the pivot arms are connected in pairs to first and second actuators for activation.

13. The pinch valve of claim 11, wherein the bladder is secured in proximity to both ends of the pinch valve.

14. The pinch valve of claim 11, wherein the bladder returns to an open position through an elastic property of a material used to form the bladder when the pivot arms are in the spread position.

15. The pinch valve of claim 11, further comprising connectors at the first and second ends for in series connection of the pinch valve in a conduit.

* * * * *